May 22, 1934.  A. V. LIVINGSTON  1,959,680
APPARATUS FOR WINDING AND THE LIKE
Filed March 7, 1930   2 Sheets-Sheet 2
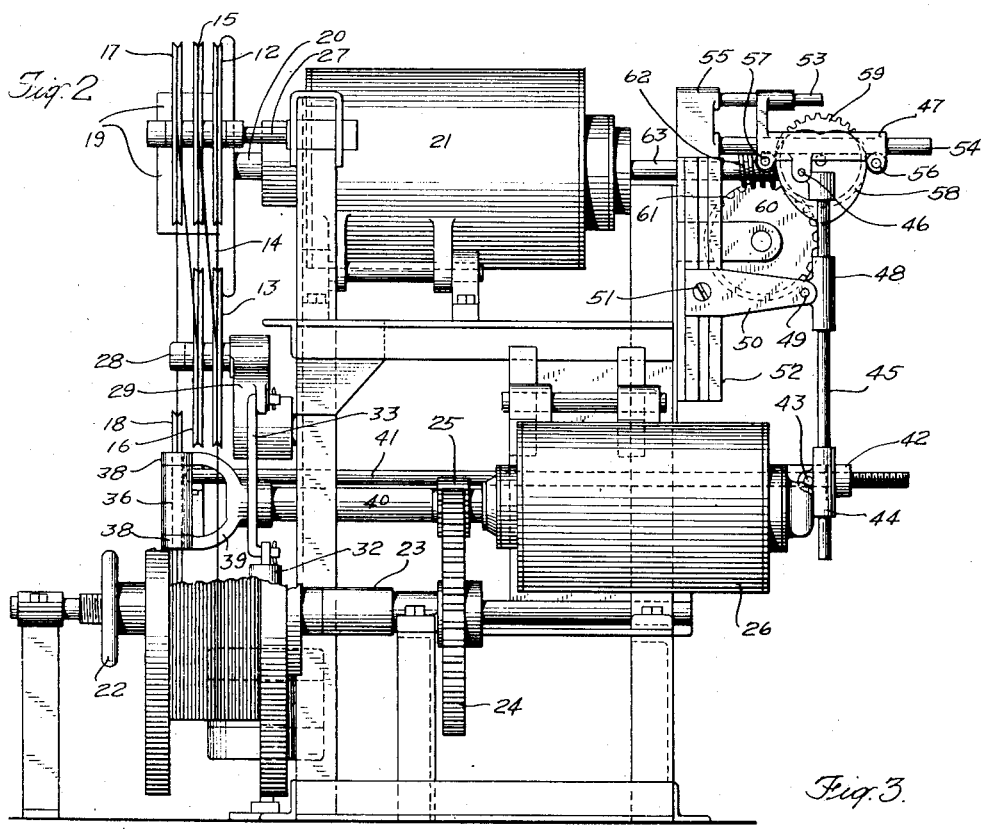

Patented May 22, 1934

1,959,680

UNITED STATES PATENT OFFICE 1,959,680

APPARATUS FOR WINDING AND THE LIKE

Alan Varley Livingston, Englewood, N. J., assignor to The Safety Car Heating & Lighting Company, a corporation of New Jersey Application March 7, 1930, Serial No. 433,942

28 Claims. (Cl. 242—45)

This invention relates to apparatus for winding and the like, and, with regard to the more specific features thereof, to the winding of coils.

One of the objects thereof is to provide practical apparatus of the above type of simple and rugged construction. Another object is to provide apparatus of the above type having efficient and dependable action. Other objects are to provide apparatus of the above type in which the tension is maintained at the desired degree; the action is under complete control to meet varying conditions; and the effect of wear and the like substantially eliminated. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings, in which is shown one of various possible embodiments of this invention, Figure 1 is a side elevation;

Fig. 2 is an end elevation; and

Fig. 3 is a diagrammatic plan showing circuit connections.

Similar reference characters refer to similar parts throughout the several views of the drawings.

Figure 1:
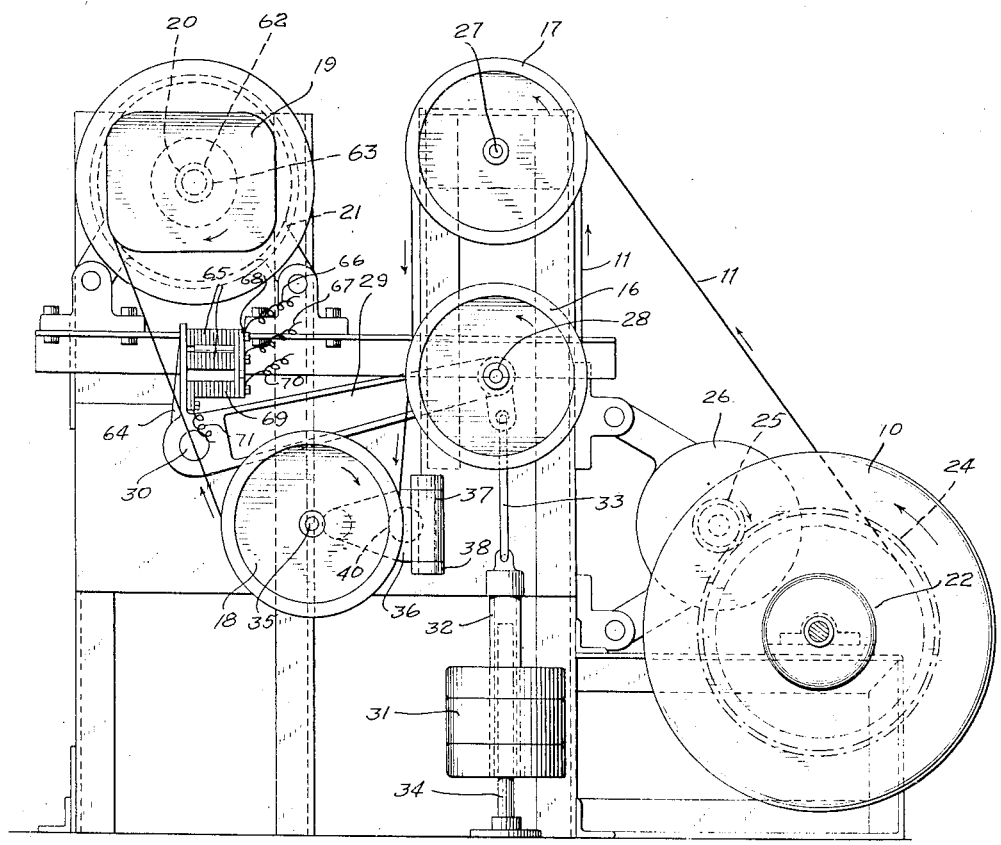

Taking up first in a broad way the arrangement of parts, there is shown at 10 a reel of wire or other material to be wound, it being understood that the term "line" is used throughout in a broad sense as covering wire, cord, thread, or other articles susceptible to a winding operation. The wire or line 11 from the reel 10 passes first over a guide pulley 12, as shown in Fig. 2, thence downwardly over a guide pulley 13, thence upwardly, as indicated at 14, over a guide pulley 15, from which it again passes downwardly over the guide pulley 16. From the latter member, it again passes upwardly over the guide pulley 17 to the lowermost guide pulley 18, from which it is fed directly to the coil 19, here shown as of a broadly rectangular form.

A mandrel or form on which coil 19 is wound is mounted upon the shaft 20 of an electric motor 21. The reel 10 is adjustably clamped in position, as by the threaded collar 22, upon a shaft 23 mounted in suitable bearings as shown, and connected through the gear 24 and pinion 25 with an electric dynamo 26.

Broadly stated, and while the machine is in its normal winding action, a motor 21 turns the form upon which is mounted the coil to be wound and draws the line over the various guide pulleys from the reel, the dynamo 26 acting yieldingly to resist the unwinding of the line from the reel and maintain a suitable tension upon the former.

Considering now the mounting of the various guide pulleys, the upper set of three pulleys 12, 15 and 17 is journaled upon a shaft 27 so as to be slidable in an axial direction to a limited extent and tend to follow the line as it is unwound from the reel. These pulleys, however, are so mounted that they continue to rotate about a fixed axis.

The pair of pulleys 13 and 16 is journaled upon a stud 28 at the end of a heavy lever 29 pivoted at 30 upon the frame of the machine. This lever and the pulleys mounted thereon are urged downwardly by a set of weights 31, variable in number and mounted upon a tubular support 32 connected with a lever, as by a link 33. This support 32 is held in alinement in its movement up and down by a fixed post 34 telescopically related to the part 32.

It will thus be seen that the set of weights 31 tends to draw downwardly the guide pulleys 13 and 16 and tension the line which is wound over them in its travel from the reel to the coil. By adjusting the number of weights, this tension may be given any desired value, and upon any tendency to excessive tension the weights are drawn upwardly with a corresponding swinging of the lever 29, whereas a tendency to slackness of the line below the predetermined desirable tension would cause a reverse movement of the lever.

The guide pulley 18 is journaled upon a stud 35 at the end of an arm 36, the opposite end of which is pivotally mounted as at 37 upon a shaft fixed within the extremities 38 of a forked fitting 39 mounted upon the end of a stationary support 40. The position of this swinging arm 36 and the guide pulley 18 mounted thereon is governed by a link 41 extending transversely of the machine and adjustably connected, as by the threaded sleeves 42 and the pivot 43, with a tubular fitting 44. Slidably mounted in this tube is a lever 45 which terminates at its upper end in a pivotal connection 46 to a carriage 47. Intermediate its ends, lever 45 passes slidably through a tube 48 pivoted at 49 to a supporting arm 50 which is adjustably connected, as by the bolt 51, with a stationary guide 52. In this manner the effective pivot of the lever 45 may be varied by loosening bolt 51 and sliding it up or down the support 52 to the desired point, at which it may be fixed by again tightening bolt 51.

The carriage 47 has a slidable connection with supporting posts 53 and 54 which extend laterally from the frame member 55. The lateral sliding motion of the carriage is gained through its cam rollers 56 and 57 embracing opposite sides of a suitably shaped cam 58 which is driven by the gears 59 and 60. These gears are driven in turn by a worm wheel 61 and worm 62 on the armature shaft 63 of the motor 21.

The action of the mechanism last described is as follows. During the winding action of the machine, the carriage 47, through the driving devices above set forth, is given a slow lateral reciprocating movement. This movement imparts a rocking movement to the lever 45, the travel of the lower end of which may be varied by a suitable vertical adjustment of the arm 50. The swinging of lever 45, acting through the link 41, causes a corresponding swinging of the arm 36 and the pulley 18 mounted thereon and accurately guides the feed of the line to the coil so that its individual convolutions will lie closely packed one to the other and be smoothly disposed in its several layers when the winding is complete.

Considering now matters of control of this apparatus, it will be noted that the lever 29, as shown in Fig. 1 of the drawings, has fixed thereon an arm 64. This arm at its upper end bears upon a pair of piles of carbon disks 65 through which current is led in series, as by the conductors 66 and 67. The opposite ends of these piles being anchored, as by the stationary plate 68, it will be seen that upon any downward swinging of the lever 29 due, as hereinbefore set forth, to a deficiency in tension upon the line, the piles will be compressed with a consequent decrease in their aggregate response. Similarly mounted between the arm 64 and the plate 68 is another carbon pile 69 connected at its ends with the conductors 70 and 71. The pressure upon this pile and its consequent resistance varies in accordance with the same action of parts as has been described in connection with the piles 65.

Turning now to Fig. 3 of the drawings, the line wires 72 and 73 are connected with any suitable source of current supply. From the line 72, conductor 74 leads the circuit through the armature 75 of the motor 21, and thence, by conductors 76 and 77, to switch contacts 78 and 79. From conductor 72, a circuit is led through the field 80 of the motor 21 and thence through conductors 81 and 82 to contacts 83 and 84.

From the line 72, a conductor 85 leads the circuit through armature 86 of the dynamo 26, from which the circuit is led through conductors 87 and 88 to a contact 89. This conductor 87 is also connected through a resistance 90 and conductor 91 to a contact 92. The conductor 87 terminates at the pivot of one of the arms 93 of a double-throw double-pole switch 94, this arm in its upper position, as shown in the drawing, making connection with the stationary contact 95, and in its lower position coming into connection with the contact 92, these contacts being connected as by conductor 96. The remaining arm 97 of this switch in the lowermost position of its throw makes connection with a stationary contact 98 for a purpose hereinafter described. A branch connection 99 from the conductor 91 terminates in the contact 100.

The conductor 85 leads to the field 101 of the dynamo 26, and thence by conductors 102 and 103 to the contacts 104 and 105.

Respectively positioned opposite the contacts 78, 83, 89, 104, 100, 105, 79 and 84 are contacts 106, 107, 108, 109, 110, 111, 112 and 113. These pairs of opposite contacts may be bridged in pairs by the bars 114, 115, 116 and 117, all insulated one from the other and forming parts of an eight-pole double-throw switch 118. In the uppermost closed position of this switch, the contacts 78, 83, 89 and 104 are electrically connected with the contacts positioned respectively opposite thereto, whereas the circuits of the four lower pairs of contacts are broken. With the switch in its lower closed position, the four lower pairs of contacts are respectively connected, whereas the circuits through the four upper pairs are broken.

Also leading from the main 72 is a conductor 70, hereinbefore referred to, from which the circuit leads through the carbon pile 69 and conductor 71 to an adjustable rheostat 119 connected with a conductor 120. The conductor 120 connects contact 108 with the bar or arm 97 of the switch 94.

From the contact 109, a circuit leads through conductor 66 and double carbon pile resistance 65 to conductor 67 which is connected with the main 73. From conductor 66, a branch 121 leads to the contact 113. From the contacts 106 and 110, a conductor 122 leads through an adjustable controller 123, and thence, by conductor 124, to the main 73.

Considering now the normal action of this apparatus, and assuming the switch 113 to be in its upper closed condition, current passes from the main 72 through the armature 75 of the motor, and thence, through conductor 76, contacts 78 and 106, and conductor 122, to the controller 123, connected by conductor 124 to main 73. Thus the current flow through the motor armature and the speed of the motor is under hand control by means of controller 123, which may be of any suitable well known form. The flow of current through the field 80 of motor 21 passes through conductor 81 and contacts 83 and 107, the latter being connected to main 73 as shown.

During this winding action, the speed of which is under complete control of the operator, the dynamo 26 has in its armature circuit, through the connections above described, the adjustable rheostat 119 and the variable resistance 69, it being understood that the contacts 89 and 108 are then bridged by the cross-bar 116 of the switch 118. The rheostat 119 being set for any desired value, it will be seen that the current flow through the dynamo armature varies with the resistance of the carbon pile 69, and, as hereinbefore described, that resistance decreases with any tendency of the lever 29 to swing downwardly due to a tendency to slackness in the line being wound. The circuit through the field 101 of the dynamo 26, passing through the bridged contacts 104 and 109, as above described, includes the carbon piles 65 whose resistance varies with the pressure thereon, the latter being a function of the tautness of the wire being wound, as hereinbefore described, and decreasing with any tendency toward slackness.

During this action it will thus be seen that the slightest tendency toward a drop in tension of the wire being wound below the desired value will permit a corresponding minute swinging of the lever 29 and a corresponding decrease in resistance of the elements 69 and 65. The element 69 is, by the connections above described, bridged across the dynamo armature, and the element 65 is connected with its field. Accordingly, this decrease in resistance will increase the load upon the dynamo and at the same time strengthen its field. Inasmuch as the function of the dynamo during this stage of action is to provide a resistance to unwinding of the reel 10, it will be seen that this resistance is increased with a corresponding tautening of the line. This tautening action brings the lower guide pulleys 13 and 16 back toward their normal position and brings the tension on the line back to its normal value. On the other hand, any undue tautness of the line will, by lifting the weight 31, have an opposite effect, loosening the carbon piles and increasing their resistance, thus lessening the opposition to the unwinding of the reel 10 and reducing the tautness to the predetermined and adjustable standard.

All of this action is substantially instantaneous, and the gradations of resistance to unwinding are susceptible to the finest variation. There is, furthermore, no variation in wear of the parts or condition of the surfaces, as might be the case with a frictional resistance, and, due to the extremely slight mechanical movement, the effect of inertia is reduced to a minimum. The rate of winding may be varied to any desired and expedient value by the controller 123, all without alteration of the maintenance of the tension at the proper standard, which is adjusted to the predetermined value as by the rheostat 119.

During this winding action, the line is nicely wound to the coil by reason of the guiding mechanism hereinbefore described, and the shape of the coil, which, as shown, would give a variable rate of pull upon the line with a constant rate of rotation of the motor 21, does not alter the tension, as each variation in rate of pull is instantly and completely neutralized by the automatic regulation of dynamo 26.

At certain stages during the winding, it is often desirable to unwind for a short distance. When this is to be done, the switch 118 is merely thrown to its lowermost closed position connecting the four lower pairs of contacts one with another and breaking circuit between the upper pairs of contacts. With the switch thus thrown, it will be seen that the dynamo 26 becomes the driving motor, and the motor or dynamo 21 takes over the brake functions, all of the devices for automatic and manual control hereinbefore described being interchanged between these machines. For example, the circuit through the armature of dynamo 26 now leads through resistance 90, conductor 99, contacts 100 and 110, to the hand controller 123, and thence to the remaining line. The field 101 of this dynamo is bridged through contacts 105 and 111 directly across the lines. We thus have this dynamo acting as a motor under the manual control of controller 123. With the parts thus positioned, the armature circuit of the dynamo or motor 21 through contacts 79 and 112 and through the bar 97 of the switch 94, the latter being in its lower closed position, is connected with the adjustable rheostat and resistance 69 to the same line, thus bridging the resistance elements 69 and 119 across the terminals of this machine. The field circuit of dynamo 21 is connected through contacts 84 and 113 to the carbon piles 65. In this manner, by the variation of pressure on the carbon piles 65 and 69, the tension is maintained at the desired degree during rewinding as it is during the winding action, and the rate of rewinding is controlled by the hand controller 123.

If during this rewinding action the switch 94 is swung into its uppermost closed position, the connection between conductors 91 and 87 is maintained, member 93 acting merely through the upper contact 95 instead of the lower contact 92. The connection between conductor 120 and the contact 112 is, however, broken, which open-circuits the armature circuit of the motor 21 acting at this stage as a brake, and greatly reduces the resistance to rewinding as it offers substantially only the friction of the armature.

If the switch 97 be placed in an open position during rewinding, that is, neither in its upper nor lower closed positions, it breaks a shunt about the resistance 90, thus inserting that resistance in series with the controller 123 and reducing the power of the dynamo 26 then acting as a winding motor to an extremely low value. With the parts thus positioned, not only is the drag of the motor 21 reduced substantially to its friction, but the dynamo 26 is so weakened in its winding action that it may be stalled by the hand of the operator. If permitted to act, it will wind very slowly, but the operator may with his hand stall it and turn the coil manually backward or forward for a few turns for inspection, still maintaining the line or wire under the desired tension by the automatic action hereinbefore described. This is of substantial practical value in the action of the machine, and the action of the parts when the switch 94 is thrown into its uppermost closed position is also highly advantageous, particularly when the winding mandrel is of small diameter and the wire or line used is light.

It will thus be seen that there is provided apparatus in which the several features of this invention are achieved. This apparatus, although under a complete manual control to meet various normal and abnormal conditions of use, is, nevertheless, maintained under a dependable automatic control so as to give a resultant coil having the desired advantageous characteristics present in a high degree.

As many possible embodiments may be made of the above invention, and as many changes might be made in the embodiment above set forth, it is to be understood that all matter hereinbefore set forth or shown in the accompanying drawings are to be interpreted as illustrative and not in a limiting sense.

I claim:

1. In apparatus of the general nature of that herein described, in combination, a pair of motors, means driven by one of said motors adapted to wind a line, means connected with the other of said motors tending therewith to resist the unwinding of said line, and means adapted to reverse the relative directions and actions of said motors upon said line so that each motor performs the function performed by the other in the first-mentioned situation.

2. In apparatus of the general nature of that herein described, in combination, a pair of electric motors, means driven by one of said motors adapted to wind a line, manually controlled means adapted to control said motor, means connected with the other of said motors tending to resist said winding action, and means adapted to render the power of said second motor greater than that of said first motor to unwind the line from said first-mentioned means and adapted to shift said manual controlling means into operative relation to said second motor.

3. In apparatus of the general nature of that herein described, in combination, a pair of electric motors, means driven by one of said motors adapted to wind a line, means connected to the other of said motors tending to retard the line, means controlled by the tension upon the line and controlling the power of said second motor, and means adapted to reverse the relative direction of rotation of said motors and thereby unwind said line from said first-mentioned means and adapted to shift said tension-responsive controlling means from said first motor to said second motor.

4. In apparatus of the general nature of that herein described, in combination, a pair of electric motors, means driven by one of said motors adapted to wind a line, manually controlled means controlling the power of said motor, means connected with said second motor tending to retard the feed of said line to said winding means, means controlled by the tension upon said line and controlling said second motor, and means adapted to alter the relative power of said motors and to shift said automatic control to said first motor and said manual control to said second motor.

5. In apparatus of the general nature of that herein described, in combination, winding means for a line, means from which said line is unwound upon actuation of said winding means, a generator operatively related to said last-mentioned means and adapted to resist said unwinding action according to the load to which it is subjected, a variable resistance in series with the field of said generator, a second variable resistance in the circuit of the armature of said generator, and means responsive to variations in the tension of said line for controlling said two resistances.

6. In apparatus of the general nature of that herein described, in combination, winding means for a line, means from which said line is unwound upon actuation of said winding means, a generator operatively related to said last-mentioned means and adapted to resist said unwinding action according to the load to which it is subjected, a carbon pile resistance across the field of said generator, a second carbon pile resistance across the armature of said generator, and means responsive to variations in the tension of said line for controlling the pressure on said carbon piles to vary the resistance thereof.

7. In apparatus of the general nature of that herein described, in combination, two members having a line wound thereon, a dynamo-electric machine operatively related to one of said members, a second dynamo-electric machine operatively related to the other of said members, means controlling the action of said dynamo-electric machines so that either one acts as a motor while the other acts as a generator, and means responsive to the tension of said line adapted to be placed in operative relation to the dynamo-electric machine acting as a generator for controlling the load thereon.

8. In apparatus of the general nature of that herein described, in combination, two members having a line wound thereon, a dynamo-electric machine operatively related to one of said members, a second dynamo-electric machine operatively related to the other of said members, means controlling the action of said dynamo-electric machines so that either one acts as a motor while the other acts as a generator, a variable resistance adapted to be shunted across the dynamo-electric machine acting as a generator, and means responsive to the tension of said line for controlling said resistance.

9. In apparatus of the general nature of that herein described, in combination, two members having a line wound thereon, a dynamo-electric machine operatively related to one of said members, a second dynamo-electric machine operatively related to the other of said members, means controlling the action of said dynamo-electric machines so that either one acts as a motor while the other acts as a generator, a resistance adapted to be shunted across the armature of the dynamo-electric machine acting as a generator, and means responsive to variations in the tension of said line for controlling said resistance.

10. In apparatus of the general nature of that herein described, in combination, two members having a line wound thereon, a dynamo-electric machine operatively related to one of said members, a second dynamo-electric machine operatively related to the other of said members, means controlling the action of said dynamo-electric machines so that either one acts as a motor while the other acts as a generator, a resistance adapted to be inserted in series with the circuit of the field of the dynamo-electric machine acting as a generator, and means responsive to the tension of said line for regulating said resistance.

11. In apparatus of the general nature of that herein described, in combination, two members having a line wound thereon, a dynamo-electric machine operatively related to one of said members, a second dynamo-electric machine operatively related to the other of said members, means controlling the action of said dynamo-electric machines so that one acts as a motor while the other acts as a generator or vice versa, a variable resistance adapted to be shunted across the armature of the dynamo-electric machine acting as a generator, a second variable resistance adapted to be connected in series with the circuit of the field of said last-mentioned dynamo-electric machine simultaneously, and means responsive to the tension of said line adapted to increase the effect of said resistances upon a tightening of said line and decrease the effect of said resistances upon a loosening of said line.

12. In apparatus of the general nature of that herein described, in combination, two members having a line wound thereon, a dynamo-electric machine operatively related to one of said members, a second dynamo-electric machine operatively related to the other of said members, means controlling the action of said dynamo-electric machines so that one acts as a motor while the other acts as a generator or vice versa, a carbon pile resistance adapted to be connected across the armature of the dynamo-electric machine acting as a generator, a second carbon pile resistance adapted to be connected in series with the circuit of the field of said last-mentioned dynamo-electric machine simultaneously, and means adapted to exert pressure upon said carbon piles when said line is loose and release said pressure upon said carbon piles when said line is tight.

13. In apparatus of the general nature of that herein described, in combination, two rotary members onto one of which a line is to be wound after it is unwound from the other, a dynamo-electric machine operatively related to one of said members, a second dynamo-electric machine operatively related to the other of said members, a source of current, a variable resistance, connections and switching means, the latter having a plurality of positions, for connecting, when in one position, said first machine to said source to be operated as a motor and to connect said resistance to affect the output of said second machine acting as a generator, and for connecting, when in another position, said second machine to said source to operate therefrom as a motor and to connect said resistance to affect the output of said first machine acting as a generator, and means responsive to the tension of said line adapted to vary said variable resistance.

14. In apparatus of the general nature of that herein described, in combination, two rotary members onto one of which a line is to be wound after it is unwound from the other, a dynamo-electric machine operatively related to one of said members, a second dynamo-electric machine operatively related to the other of said members, a source of current, a variable resistance, connections and switching means, the latter having a plurality of positions, for connecting, when in one position, said first machine to said source to be operated as a motor and to connect said resistance to affect the output of said second machine acting as a generator, and for connecting, when in another position, said second machine to said source to operate therefrom as a motor and to connect said resistance to affect the output of said first machine acting as a generator, means responsive to the tension of said line adapted to vary said variable resistance, and means controllable at will for reducing substantially to zero the output of the machine acting as a generator, thereby to reduce the resistance to winding substantially to the friction load represented by that machine.

15. In apparatus of the general nature of that herein described, in combination, two rotary members onto one of which a line is to be wound after it is unwound from the other, a dynamo-electric machine operatively related to one of said members, a second dynamo-electric machine operatively related to the other of said members, a source of current, a variable resistance, connections and switching means, the latter having a plurality of positions, for connecting, when in one position, said first machine to said source to be operated as a motor and to connect said resistance to affect the output of said second machine acting as a generator, and for connecting, when in another position, said second machine to said source to operate therefrom as a motor and to connect said resistance to affect the output of said first machine acting as a generator, means responsive to the tension of said line adapted to vary said variable resistance, a resistance, and switching means operable at will for inserting said resistance in the circuit of one of said machines when acting as a motor, thereby to reduce its speed materially below normal.

16. In apparatus of the general nature of that herein described, in combination, two rotary members onto one of which a line is to be wound after it is unwound from the other, a dynamo-electric machine operatively related to one of said members, a second dynamo-electric machine operatively related to the other of said members, a source of current, a variable resistance, connections and switching means, the latter having a plurality of positions, for connecting, when in one position, said first machine to said source to be operated as a motor and to connect said resistance to affect the output of said second machine acting as a generator, and for connecting, when in another position, said second machine to said source to operate therefrom as a motor and to connect said resistance to affect the output of said first machine acting as a generator, means responsive to the tension of said line adapted to vary said variable resistance, a resistance affected by said switching means and positioned by the latter, when in one position, in the circuit of one of said machines when acting as a motor and adapted to lower the speed standard at which said machine as a motor operates, and additional switching means for affecting the action of said second mentioned resistance.

17. In apparatus of the general nature of that herein described, in combination, two rotary members onto one of which a line is to be wound after it is unwound from the other, a dynamo-electric machine operatively related to one of said members, a second dynamo-electric machine operatively related to the other of said members, a source of current, a variable resistance, connections and switching means, the latter having a plurality of positions, for connecting, when in one position, said first machine to said source to be operated as a motor and to connect said resistance to affect the output of said second machine acting as a generator, and for connecting, when in another position, said second machine to said source to operate therefrom as a motor and to connect said resistance to affect the output of said first machine acting as a generator, means responsive to the tension of said line adapted to vary said variable resistance, a resistance affected by said switching means and positioned by the latter, when in one position, in the circuit of one of said machines when acting as a motor and adapted to lower the speed standard at which said machine as a motor operates, and means operable at will and independently of said switching means for leaving said second mentioned resistance in its circuit or removing it therefrom.

18. In apparatus of the general nature of that herein described, in combination, two rotary members onto one of which a line is to be wound after it is unwound from the other, a dynamo-electric machine operatively related to one of said members, a second dynamo-electric machine operatively related to the other of said members, a source of current, a variable resistance, connections and switching means, the latter having a plurality of positions, for connecting, when in one position, said first machine to said source to be operated as a motor and to connect said resistance to affect the output of said second machine acting as a generator, and for connecting, when in another position, said second machine to said source to operate therefrom as a motor and to connect said resistance to affect the output of said first machine acting as a generator, means responsive to the tension of said line adapted to vary said variable resistance, a resistance affected by said switching means and positioned by the latter, when in one position, in the circuit of one of said machines when acting as a motor and adapted to lower the speed standard at which said machine as a motor operates, and a second switching means having a plurality of positions and having connections with respect to said second resistance and with the circuit of one of said machines when acting as a generator for making said second resistance effective and reducing the output of the machine acting as a generator substantially to zero, when moved into one position, and for making said second resistance ineffective when moved into another position.

19. In apparatus of the general nature of that herein described, in combination, two rotary members onto one of which a line is to be wound after it is unwound from the other, a dynamo-electric machine operatively related to one of said members, a second dynamo-electric machine operatively related to the other of said members, a source of current, a variable resistance, connections and switching means, the latter having a plurality of positions, for connecting, when in one position, said first machine to said source to be operated as a motor and to connect said resistance to affect the output of said second machine acting as a generator, and for connecting, when in another position, said second machine to said source to operate therefrom as a motor and to connect said resistance to affect the output of said first machine acting as a generator, means responsive to the tension of said line adapted to vary said variable resistance, means for affecting one of said machines when operating as a motor to reduce its speed to a value so low that the rotary member driven thereby may be manually halted, and means operable at will for controlling said speed-reducing means.

20. In apparatus of the general nature of that herein described, in combination, two rotary members onto one of which a line is to be wound after it is unwound from the other, a dynamo-electric machine operatively related to one of said members, a second dynamo-electric machine operatively related to the other of said members, a source of current, a variable resistance, connections and switching means, the latter having a plurality of positions, for connecting, when in one position, said first machine to said source to be operated as a motor and to connect said resistance to affect the output of said second machine acting as a generator, and for connecting, when in another position, said second machine to said source to operate therefrom as a motor and to connect said resistance to affect the output of said first machine acting as a generator, means responsive to the tension of said line adapted to vary said variable resistance, means for determining at will the speed at which one of said machines when acting as a motor drives its operatively related rotary member, and means for setting the electrical standard of operation of said variable resistance to set a corresponding standard of output of the other machine acting as a generator at the speed of drive of the machine acting as a motor.

21. In apparatus of the general nature of that herein described, in combination, two rotary members onto one of which a line is to be wound after it is unwound from the other, a dynamo-electric machine operatively related to one of said members, a second dynamo-electric machine operatively related to the other of said members, a source of current, a variable resistance, switching means having a plurality of positions and having connections whereby, in one position, one of said machines is connected to said source to be operated therefrom as a motor and said resistance is bridged across the other of said machines acting as a generator and, when in another position, said variable resistance and said source are interchanged with respect to said machines, and means responsive to the tension of said line for controlling said variable resistance.

22. In apparatus of the general nature of that herein described, in combination, two rotary members onto one of which a line is to be wound after it is unwound from the other, a dynamo-electric machine operatively related to one of said members, a second dynamo-electric machine operatively related to the other of said members, a source of current, an energy consuming device, a variable resistance, electrical connections and switching means, the latter having a plurality of positions, for connecting one of said machines to said source and said device across the armature of the other machine and said variable resistance in the field circuit of the other of said machines when said switching means is in one position and is electrically interchanging said two machines with respect to said source and said device and said variable resistance when in another position, and means responsive to the tension of said line for controlling said variable resistance.

23. In apparatus of the general nature of that herein described, in combination, a rotary member upon which a line is to be wound, means rotating said member at substantially uniform speed, a reel holding a supply of line to be wound therefrom and onto said rotary member, an electric generator driven by said reel, a resistance having the inherent characteristic of variability in accordance with variation in pressure applied thereto for controlling the output of said generator, a two-armed pivoted lever, one arm of which is long and the other arm of which is short, means whereby changes in the tension of said line operate upon the long arm of said lever and correspondingly swing said lever about its axis, and means relating said resistance to be affected by the proportionately smaller amplitudes of swing of said short arm and thereby to change the magnitude of the output of said generator inversely to variations in tension of said line.

24. In apparatus of the general nature of that herein described, in combination, a rotary member upon which a line is to be wound, means rotating said member at substantially uniform speed, a reel holding a supply of line to be wound therefrom and onto said rotary member, an electric generator driven by said reel, a resistance having the inherent characteristic of variability in accordance with variation in pressure applied thereto for controlling the output of said generator, and means for causing variations in the tension of said line to affect said resistance to change the output of said generator inversely as the tension changes comprising means for mechanically multiplying as increment of force resulting from a change in tension and for applying the multiplied force to said resistance.

25. In apparatus of the general nature of that herein described, in combination, a rotary member upon which a line is to be wound, said member having line-receiving portions of different radii, means rotating said member at substantially uniform speed, a reel holding a supply of line to be wound therefrom and onto said rotary member, the different radii of said rotary member tending to cause variations in the tension at which said line is wound for any single turn onto said rotary member, an electric generator driven by said reel, a carbon pile for controlling the output of said generator, means movable in accordance with variations in the tension of said line, and means for transmitting pressure from said movable means to said carbon pile.

26. In apparatus of the general nature of that herein described, in combination, a source of supply of line, a motor, a rotary device driven by said motor adapted to wind said line from said source of supply, means adapted automatically to guide said line laterally back and forth at a predetermined rate as it is wound, means driving said guiding means from said motor, electric means for retarding the action of said winding means, and a carbon pile resistance responsive to the tension of said line in the circuit of said motor.

27. In apparatus of the general nature of that herein described, in combination, a motor, means driven in one direction by said motor and adapted to wind a line, means adapted automatically to maintain the tension upon said line substantially constant, and manually operable means adapted to alter the circuit of said motor and reduce the driving power of said motor thereby to permit manual turning of said winding means against the direction of rotation imparted to it by said motor.

28. In apparatus of the general nature of that herein described, in combination, a rotary member upon which a line is to be wound, means rotating said member at substantially uniform speed, a reel holding a supply of line to be unwound therefrom and onto said rotary member, an electric generator driven by said reel, a carbon pile resistance for controlling the output of said generator, a two armed pivoted lever, means whereby changes in the tension of said line operate upon one arm of said lever and correspondingly swing said lever about its axis, and means relating said carbon pile resistance so that it is affected by the swing of the other arm of said lever thereby to change the magnitude of the output of said generator inversely to variations in the tension of said line.

ALAN VARLEY LIVINGSTON.